United States Patent [19]

Hayami et al.

[11] Patent Number: 5,200,915
[45] Date of Patent: Apr. 6, 1993

[54] DEVICE FOR RAPIDLY SOLVING A SYMMETRIC LINEAR SYSTEM ON A SUPERCOMPUTER

[75] Inventors: Ken Hayami; Hiroshi Watanabe, both of Tokyo, Japan

[73] Assignee: NEC Corporation, Tokyo, Japan

[21] Appl. No.: 712,890

[22] Filed: Jun. 12, 1991

[30] Foreign Application Priority Data

Jun. 12, 1990 [JP] Japan .................. 2-151664

[51] Int. Cl.$^5$ ............................................. G06F 7/38
[52] U.S. Cl. ............................................. 364/736
[58] Field of Search ................ 364/735, 736, 754

[56] References Cited

U.S. PATENT DOCUMENTS

3,621,209 11/1971 Businger ........................ 364/735

OTHER PUBLICATIONS

M. L. James et al., "Applied Numerical Methods for Digital Computation with FORTRAN and CSMP", second edition, copyright 1977 by Harper & Row, Publishers, Inc. pp. 194–199.

Primary Examiner—Long T. Nguyen
Attorney, Agent, or Firm—Foley & Lardner

[57] ABSTRACT

In order to solve a symmetric linear system given by $AU=b$, a supercomputer or vector processor calculates a solution vector u using a right-hand side vector b, a diagonal matrix, and an upper triangular matrix. Supplied with an array (JA) representing a column number of the upper triangular matrix, a pointer array constructing section (11) constructs a pointer array (JL) which points to a lower triangular matrix. Supplied with an array (AA) and the array (JA) which collectively represent a combination of the diagonal matrix and the upper triangular matrix, a matrix decomposing section (12) decomposes the array (AA) into an approximate matrix (M) which approximates a symmetric coefficient matrix A. A first product calculating section (16) calculates a first product vector (y) using the array (AA), the array (JA), a first vector (x), and the pointer array (JL). A second product calculating section (17) calculates a second product vector (y') using the approximate matrix (M) and a second vector (x'). An iterative calculating section (18) carries out iterative calculation on the array (AA), the array (JA), an array (B) representing the right-hand side vector, and the first and the second product vectors (y) and (y') to iteratively provide the first and the second product calculating sections with the first and the second vectors, respectively, and to finally produce the solution vector (u).

4 Claims, 6 Drawing Sheets

FIG. I(A) A:

$$\begin{pmatrix} a_{11} & a_{12} & & a_{14} & & a_{16} & & \\ a_{12} & a_{22} & a_{23} & & & & a_{27} & \\ & a_{23} & a_{33} & a_{34} & & a_{36} & & a_{38} \\ a_{14} & & a_{34} & a_{44} & a_{45} & & a_{47} & \\ & & & a_{45} & a_{55} & & & a_{58} \\ a_{16} & & a_{36} & & & a_{66} & a_{67} & \\ & a_{27} & & a_{47} & & a_{67} & a_{77} & a_{78} \\ & & a_{38} & & a_{58} & & a_{78} & a_{88} \end{pmatrix}$$

FIG. I(B) u:
$$\begin{pmatrix} u_1 \\ u_2 \\ u_3 \\ u_4 \\ u_5 \\ u_6 \\ u_7 \\ u_8 \end{pmatrix}$$

FIG. I(C) b:
$$\begin{pmatrix} b_1 \\ b_2 \\ b_3 \\ b_4 \\ b_5 \\ b_6 \\ b_7 \\ b_8 \end{pmatrix}$$

F I G. 2

AA:

| $a_{11}$ | $a_{12}$ | $a_{14}$ | $a_{16}$ |
|---|---|---|---|
| $a_{22}$ | $a_{23}$ | $a_{27}$ | |
| $a_{33}$ | $a_{34}$ | $a_{36}$ | $a_{38}$ |
| $a_{44}$ | $a_{45}$ | $a_{47}$ | |
| $a_{55}$ | $a_{58}$ | | |
| $a_{66}$ | $a_{67}$ | | |
| $a_{77}$ | $a_{78}$ | | |
| $a_{88}$ | | | |

F I G. 3(A)

JA:

| 1 | 2 | 4 | 6 |
|---|---|---|---|
| 2 | 3 | 7 | |
| 3 | 4 | 6 | 8 |
| 4 | 5 | 7 | |
| 5 | 8 | | |
| 6 | 7 | | |
| 7 | 8 | | |
| 8 | | | |

F I G. 3(B)

B:

| $b_1$ |
|---|
| $b_2$ |
| $b_3$ |
| $b_4$ |
| $b_5$ |
| $b_6$ |
| $b_7$ |
| $b_8$ |

| | | | |
|---|---|---|---|
| 9 | | | |
| 10 | | | |
| 17 | 11 | | |
| 12 | | | |
| 25 | 19 | | |
| 18 | 20 | 14 | |
| 27 | 13 | 15 | |

DEVICE FOR RAPIDLY SOLVING A SYMMETRIC LINEAR SYSTEM ON A SUPERCOMPUTER

BACKGROUND OF THE INVENTION

This invention relates to a device for solving a symmetric linear system and, in particular, to a device for calculating, on a supercomputer having a high vector processing ability, an approximate solution of a partial differential equation by using a discretization method, such as a finite element method or a finite difference method.

A large sparce symmetric linear system arises from discretization of the partial differential equation on solving the partial differential equation by using the discretization method.

As well known in the art, a general symmetric linear system is given by:

$$Au = b, \qquad (1)$$

where A represents an N by N symmetric coefficient matrix with coefficient elements $a_{ij}$ (i, j=1, ..., N), b, a right-hand side vector of Equation (1) with right-hand side elements $b_i$, and u, a solution vector with solution elements $u_i$. The symmetric coefficient matrix A is equal to a three-term sum of a diagonal matrix Da with diagonal elements $a_{11}, \ldots, a_{NN}$ of the coefficient elements plus an upper triangular matrix Ua with upper triangular elements of the coefficient elements plus a lower triangular matrix La with lower triangular elements of the coefficient elements. That is:

$$A = Ua + Da + La. \qquad (2)$$

Inasmuch as the symmetric coefficient matrix A is symmetrical, namely, $a_{ji} = a_{ij}$, one of the upper and the triangular matrices Ua and La is equal to a transpose matrix of the other of the upper and the trianglar matrices. That is:

$$Ua = La^T, \qquad (3)$$

and $$La = Ua^T. \qquad (4)$$

Under the circumstances, a scalar processor calculates a numerical solution of the general symmetric linear system by a calculation method which uses the diagonal matrix Da and one of the upper and the lower triangular matrices Ua and La as input data for use in the symmetric coefficient matrix A.

However, the calculation method for use in a scalar processor is not available on a supercomputer having a high vector processing ability. This is because the calculation method for use in the scalar processor makes the supercomputer carry out calculations with shorter vector lengths. The supercomputer is, therefore, put into operation by a conventional calculation method which uses, as input data, all of the diagonal matrix Da, the upper triangular matrix Ua, the lower triangular matrix La, and the right-hand side vector b.

Therefore, the conventional calculation method for use in a supercomputer is disadvantageous in that it must prepare, as the input data for use in the symmetric coefficient matrix A, all of the coefficient elements of the symmetric coefficient matrix A. In addition, the conventional calculation method for use in the supercomputer requires a larger memory area for the input data.

SUMMARY OF THE INVENTION

It is an object of the present invention to provide a device for solving a symmetric linear system that is capable of carrying out vector processing at a high speed on a supercomputer having high vector processing ability.

It is another object of the present invention to provide a device for solving a symmetric linear system of the type described, wherein it is necessary for input data to prepare only a right-hand side vector of an Equation, a diagonal matrix, and one of upper and lower triangular matrices.

It is still another object of the present invention to provide a device for solving a symmetric linear system of the type described, wherein it requires a smaller memory area for the input data.

On describing the gist of an aspect of this invention, it is possible to understand that a device is for solving a symmetric linear system given by Au=b, where A represents a symmetric coefficient matrix, b represents a right-hand side vector, and u represents a solution vector. The symmetric coefficient matrix is equal to a three-term sum of a diagonal matrix plus an upper triangular matrix plus a lower triangular matrix which is equal to a transpose matrix of the upper triangular matrix. The device is supplied with the right-hand side vector, the diagonal matrix, and the upper triangular matrix. The device calculates the solution vector by using the right-hand side vector, the diagonal matrix, and the upper triangular matrix.

According to this invention, the above-understood device comprises constructing means supplied with the upper triangular matrix for constructing a pointer array which points to the lower triangular matrix. Supplied with the diagonal matrix and the upper triangular matrix, decomposing means decomposes the diagonal matrix and the upper triangular matrix into an approximate matrix which approximates the symmetric coefficient matrix. Supplied with the diagonal matrix, the upper triangular matrix, and a first vector and connected to the constructing means, first product calculating means calculates a first product vector by using the diagonal matrix, the upper triangular matrix, the first vector, and the pointer array. The first product vector is equal to a product of the symmetric coefficient matrix and the first vector. Supplied with a second vector and connected to the decomposing means, second product calculating means calculates a second product vector by using the approximate matrix and the second vector. The second product vector is equal to a product of an inverse matrix of the approximate matrix and the second vector. Supplied with the diagonal matrix, the upper triangular matrix, and the right-hand side vector and connected to the first and the second product calculating means, iterative calculating means carries out iterative calculation on the diagonal matrix, the upper triangular matrix, the right-hand side vector, the first and the second product vectors. The iterative calculating means iteratively provides the first and the second product calculating means with the first and the second vectors to make the first and the second product calculating means iteratively calculate the first and the second product vectors, respectively. The iterative calculating means produces the solution vector.

On describing the gist of another aspect of this invention, it is possible to understand that a device is for solving a symmetric linear system given by Au=b, where A represents a symmetric coefficient matrix, b represents a right-hand side vector, and u represents a solution vector. The symmetric coefficient matrix is equal to a three-term sum of a diagonal matrix plus an upper triangualar matrix plus a lower triangular matrix which is equal to a transpose matrix of the upper triangular matrix. The device is supplied with the right-hand side vector, the diagonal matrix, and the lower triangular matrix. The device calculates the solution vector by using the right-hand side vector, the diagonal matrix, and the lower triangular matrix.

According to this invention, the afore-understood device comprises constructing means supplied with the lower triangular matrix for constructing a pointer array which points to the upper triangular matrix. Supplied with the diagonal matrix and the lower triangular matrix, decomposing means decomposes the diagonal matrix and the lower triangular matrix into an approximate matrix which approximates the symmetric coefficient matrix. Supplied with the diagonal matrix, the lower triangular matrix, and a first vector and connected to the constructing means, first product calculating means calculates a first product vector by using the diagonal matrix, the lower triangular matrix, the first vector, and the pointer array. The first product vector is equal to a product of the symmetric coefficient matrix and the first vector. Supplied with a second vector and connected to the decomposing means, second product calculating means calculates a second product vector by using the approximate matrix and the second vector. The second product vector is equal to a product of an inverse matrix of the approximate matrix and the second vector. Supplied with the diagonal matrix, the lower triangular matrix, the right-hand side vector and connected to the first and the second product calculating means, iterative calculating means carries out iterative calculation on the diagonal matrix, the lower triangular matrix, the right-hand side vector, the first and the second product vectors. The iterative calculating means iteratively provides the first and the second product calculating means with the first and the second vectors to make the first and the second product calculating means iteratively calculate the first and the second product vectors, respectively. The iterative calculating means produces the solution vector.

DESCRIPTION OF THE PREFERRED EMBODIMENTS

Description will be made at first with regard to a symmetric linear system which is to be solved by a device according to this invention. Such a symmetric linear system arises in numerical simulation of a partial differential equation on solving the partial differential equation by using a discretization method, such as a finite element method or a finite difference method. As well known in the art, a general symmetric linear system is given by:

$$Au = b, \tag{5}$$

where A represents an N by N symmetric coefficient matrix with coefficient elements $a_{ij}$ (i, j = 1, ..., N), b, a right-hand side vector of Equation (5) with right-hand side element $b_i$, and u, a solution vector with solution elements $u_i$, and where N represents a first predetermined natural number, and each of i and j, variable from one to N. The N by N symmetric coefficient matrix A is equal to a three-term sum of a diagonal matrix Da with diagonal elements $a_{11}, ..., a_{NN}$ of the coefficient elements plus an upper triangular matrix Ua with upper triangular elements of the coefficient elements plus a lower triangular matrix La with lower triangular elements of the coefficient elements. That is:

$$A = Ua + Da + La. \tag{6}$$

Inasmuch as the N by N symmetric coefficient matrix A is symmetrical, namely, $a_{ij} = a_{ji}$, the upper triangular matrix Ua is equal to a transpose matrix of the lower triangular matrix La while the lower triangular matrix La is equal to a transpose matrix of the upper triangular matrix Ua. That is:

$$Ua = La^T, \tag{7}$$

and $$La = Ua^T. \tag{8}$$

Figure 1A:
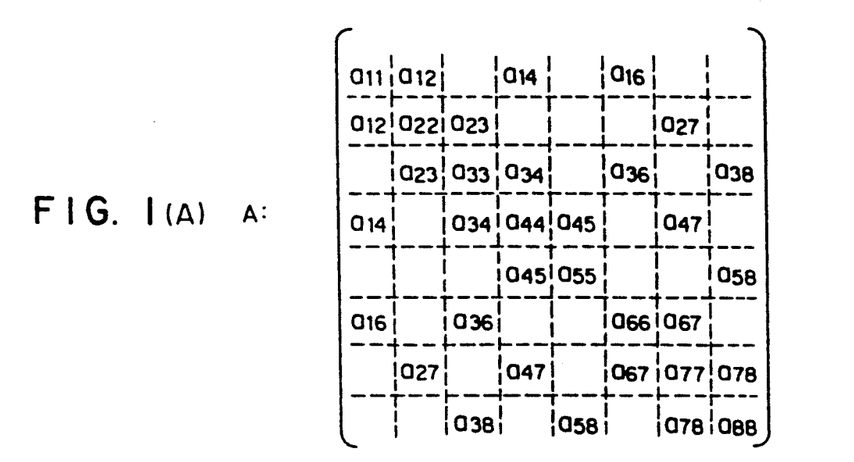
FIGS. 1(A), (B), and (C) show examples of a symmetric coefficient matrix, a solution vector, and a right-hand side vector which define a symmetric linear system for use in describing operation of a device according to the instant invention.
Figure 1B:
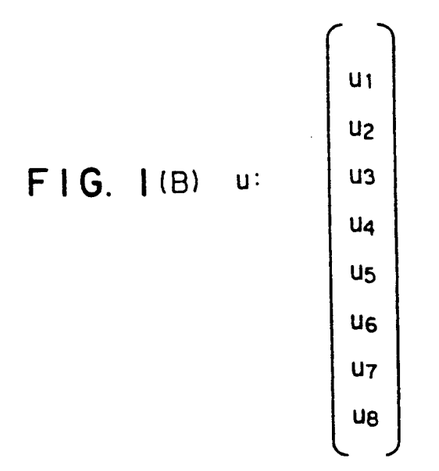
Figure 1C:
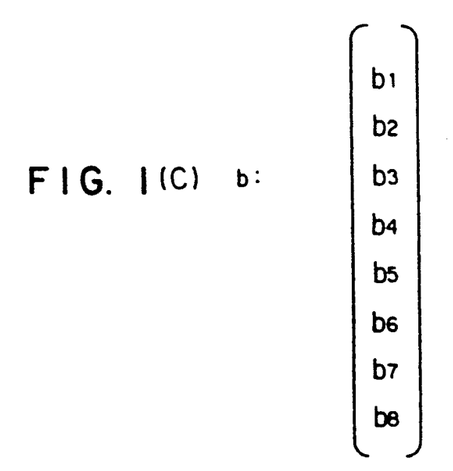

FIGS. 1(A) through (C) show examples of the N by N symmetric coefficient matrix A, the solution vector u, and the right-hand side vector b, respectively. In the example being illustrated, the first predetermined natural number N is equal to eight. This example will be used in describing operation of the device according to this invention. The eight by eight symmetric coefficient matrix A has the coefficient elements $a_{11}$ to $a_{88}$ each of which has a non-zero real number value $a_{ij}$ as shown in FIG. 1(A). The solution vector u has the solution elements $u_1$ to $u_8$ which have unknown real number values and are represented by u1 to u8 as shown in FIG. 1(B). The right-hand side vector b has the right-hand side elements $b_1$ to $b_8$ which have known real number values and are represented by $b_1$ to $b_8$ as shown in FIG. 1(C). In the eight by eight symmetric coefficient matrix A, each blank element has a value of zero.

Figure 2:
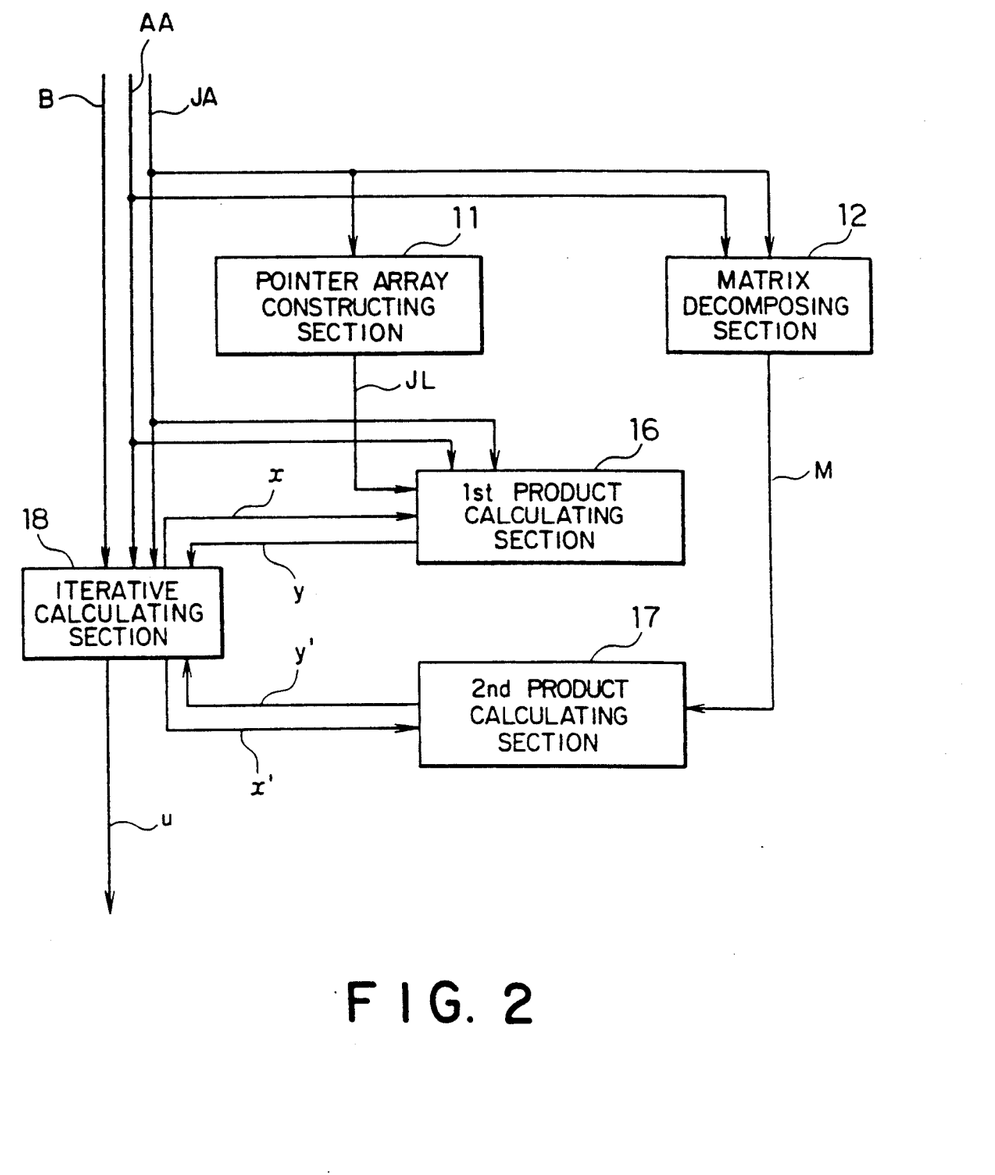
FIG. 2 is a block diagram of a device according to an embodiment of the instant invention.

Referring to FIG. 2, a device according to a preferred embodiment of this invention is for solving the symmetric linear system given by Equation (5). The device is supplied with, as input data, the right-hand side vector b, the diagonal matrix Da, and the upper triangular matrix Ua. The device calculates the solution vector u by using the right-hand side vector b, the diagonal matrix Da, and the upper triangular matrix Ua.

Figure 3A:
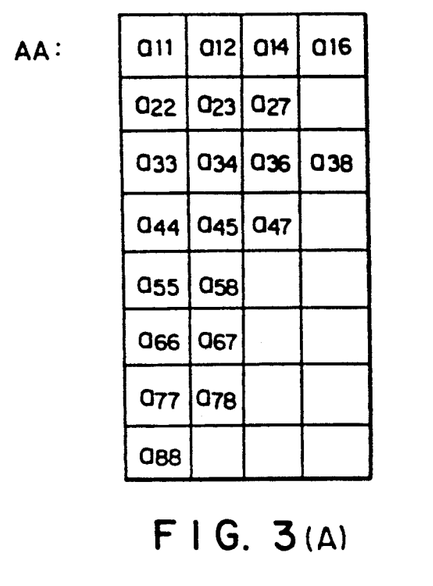
FIGS. 3(A), (B), and (C) collectively show an example of input data which is supplied to the device illustrated in FIG. 2.
Figure 3B:
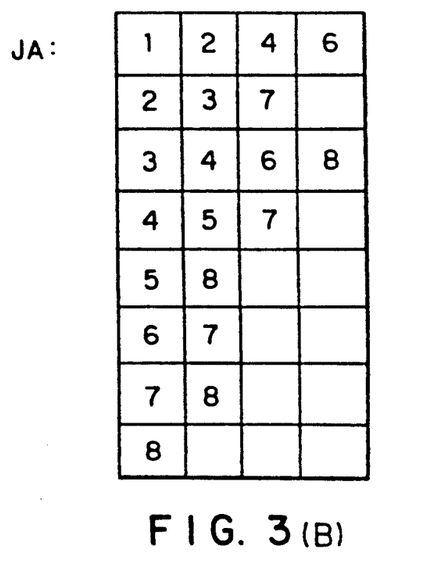
Figure 3C:
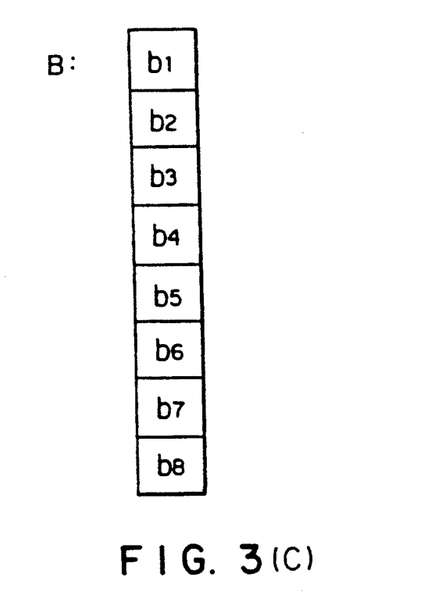

Turning to FIGS. 3(A) through (C) as a short while, an example of the input data is collectively shown. The input data is divided into input data for use in the eight by eight symmetric coefficient matrix A and input data for use in the right-hand side vector b.

The input data for use in the eight by eight symmetric coefficient matrix A comprises a two-dimensional array AA of real numbers and a two-dimensional array JA of integers which are shown in FIGS. 3(A) and (B), respectively. The two-dimensional array AA comprises, as non-zero elements, the diagonal elements $a_{11}$ to $a_{88}$ of the diagonal matrix Da and the upper triangular elements $a_{12}$ to $a_{78}$ of the upper triangular matrix Ua. The two dimensional array JA comprises array elements representative of the number given to columns of the non-zero elements in the two-dimensional array AA. In the example being illustrated, each of the two-dimensional array AA and the two-dimensional array JA has eight rows and four columns. At any rate, the input data for use in the eight by eight symmetric coefficient matrix A represents a combination of the diagonal matrix Da and the upper triangular matrix Ua.

The input data for use in the right-hand side vector b comprises a one-dimensional array B of real numbers. The one-dimensional array B comprises the right-hand side elements $b_1$ to $b_8$ of the right-hand side vector b.

It is noted that the non-zero elements in an i-th row of the eight by eight symmetric coefficient matrix A are located in the i-th row of the two-dimensional array AA and the number given to the columns thereof are located in the i-th row of the two-dimensional array JA. In each of the two-dimensional array AA and the two-dimensional array JA, each blank element has the value of zero.

Turning back to FIG. 2, the device is supplied with the two-dimensional array AA, the two-dimensional array JA, and the one-dimensional array B. The illustrated device comprises a pointer array constructing section 11, a matrix decomposing section 12, a first product calculating section 16, a second product calculating section 17, and an iterative calculating section 18.

The pointer array constructing section 11 is supplied with the two-dimensional array JA. In the manner which will later become clear, the pointer array constructing section 11 constructs a pointer array JL which points to the lower triangular matrix La, namely, $Ua^T$.

The matrix decomposing section 12 is supplied with the two-dimensional array AA and the two-dimensional array JA. In the manner which will later become clear, the matrix decomposing section 12 decomposes the two-dimensional array AA into an approximate matrix M which approximates the eight by eight symmetric coefficient matrix A.

The first product calculating section 16 is supplied with the two-dimensional array AA, the two-dimensional array JA, and a first vector x which vector will presently be described. The first product calculating section 16 is connected to the pointer array constructing section 11. The first product calculating section 16 calculates a first product vector y by using the two-dimensional array AA, the two-dimensional array JA, the first vector x, and the pointer array JL in the manner which will later become clear. The first product vector y is equal to a product of the eight by eight symmetric coefficient matrix A and the first vector x.

The second product calculating section 17 is supplied with a second vector x which will presently be described. The second product calculating section 17 is connected to the matrix decomposing section 12. The second product calculating section 17 calculates a second product vector y' by using the approximate matrix M and the second vector x'. The second product vector y' is equal to a product of an inverse matrix $M^{-1}$ of the approximate matrix M and the second vector x'.

The iterative calculating section 18 is supplied with the two-dimensional array AA, the two-dimensional array JA, and the one-dimensional array B. The iterative calculating section 18 is connected to the first and the second product calculating sections 16 and 17. The iterative calculating section 18 carries out iterative calculation on the two-dimensional array AA, the two-dimensional array JA, the one-dimensional array B, the first and the second product vectors y and y' in the manner which will later be described. The iterative calculating section 18 iteratively provides the first and the second product calculating sections 16 and 17 with the first and the second vectors x and x' to make the first and the second product calculating sections 16 and 17 iteratively calculate the first and the second product vectors y and y' until the second vector x' has a desired small norm which will later be described. The iterative calculating section 18 produces the solution vector u.

Figure 4:
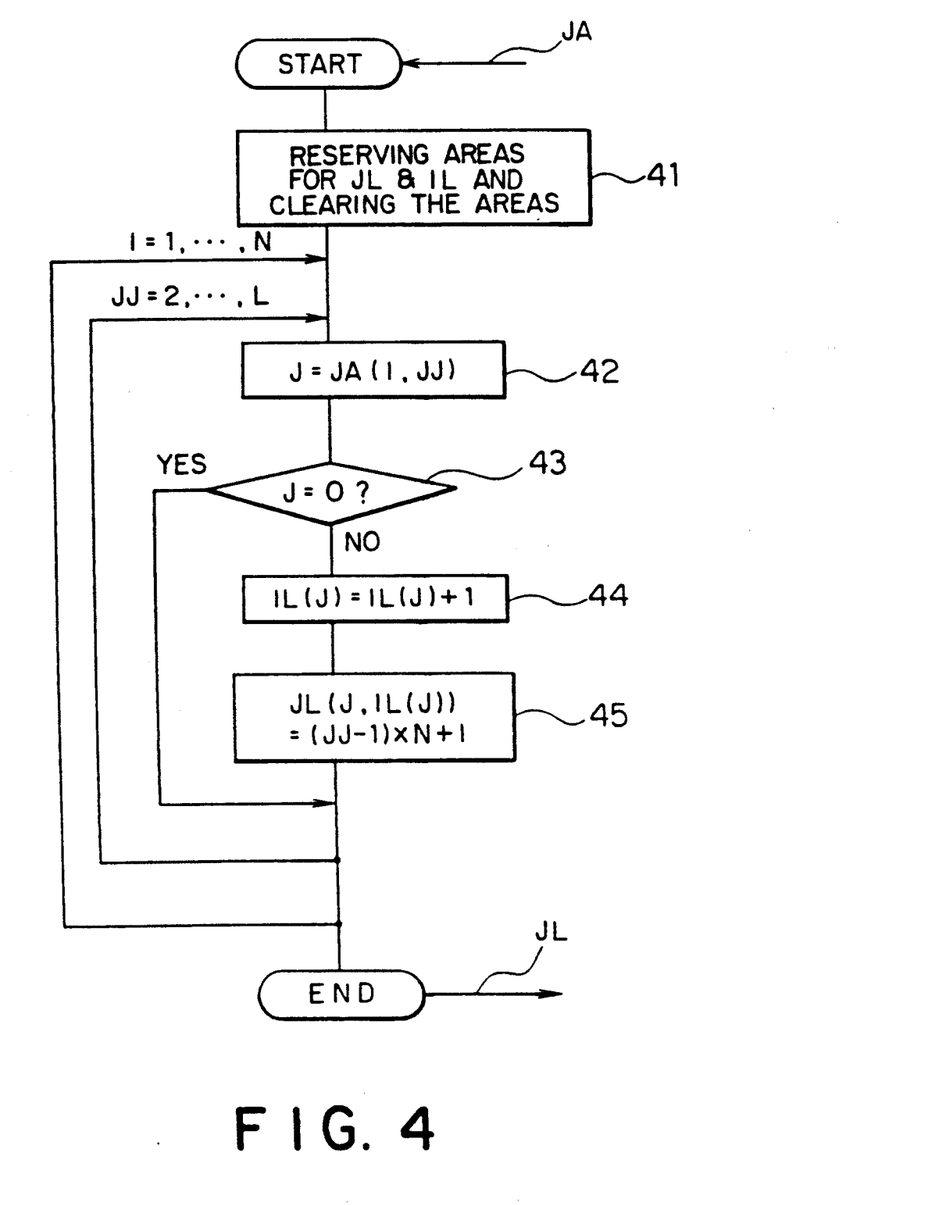
FIG. 4 shows a flow chart for use in describing operation of a pointer array constructing section for use in the device illustrated in FIG. 2.

Referring to FIG. 4 in addition to FIG. 2, the description will proceed to operation of the pointer array constructing section 11. It will be assumed as follows. The first predetermined natural number N is equal to the number of elements of Equation (5), namely, the number of the rows in the two-dimensional array AA or the two-dimensional array JA. In the example being illustrated, the first predetermined natural number N is equal to eight. A second predetermined natural number L is equal to the number of the columns in the two-dimensional array AA or the two-dimensional array JA. In the example being illustrated, the second predetermined natural number L is equal to four. The pointer array JL is an N by L two-dimensional array of integers. In the example being illustrated, the pointer array JL is an eight by four two-dimensional array. A one-dimensional array IL of integers is an array for use in a workspace for constructing the two-dimensional array JL. In the example being illustrated, the one-dimensional array IL has eight rows.

For convenience of the description which follows, first and second variables I and JJ will be used. The first variable I is variable from one to the first predetermined natural number N, both inclusive. The second variable JJ is variable from two to the second predetermined natural number L, both inclusive.

At a step 41, two memory areas are reserved for use in storage of the two-dimensional array JL and the one-dimensional array IL therein as memory contents. Before storage of the memory contents, the two memory areas are cleared to be equal to zero at the step 41. The step 41 is followed by a step 42 for picking up a column number J which is the number represented by the two-dimensional array JA(I, JJ) at the I-th row and the JJ-th column. Therefore, the column number J corresponds to a column number of the non-zero element which is located in the I-th row and the J-th column of the upper triangular matrix Ua of the eight by eight symmetric coefficient matrix A. The step 42 proceeds to a step 43 for judging whether or not the column number J is equal to zero.

When the column number J is not equal to zero, the corresponding non-zero element is present in the I-th row and the J-th column of the upper triangular matrix Ua. When the non-zero element is present in the I-th row and the J-th column of the upper triangular matrix Ua, the same non-zero element is present in a J-th row and an I-th column of the lower triangular matrix La. When the column number J is not equal to zero, the step 43 is followed by a step 44 at which one is added to the one-dimensional array IL(J). The step 44 is succeeded by a step 45 for calculating the pointer array JL(J, IL(J)) as follows:

$$JL(J, IL(J)) = (JJ-1) \times N + I. \quad (9)$$

Equation (9) represents where of the two-dimensional array AA and the two-dimensional array JA the non-zero element of the J-th row and the I-th column in the lower triangular matrix La corresponds to. More specifically, it will be presumed that a third variable IJ is equal to the number of the two-dimensional array JA(J, IL(J)), namely, IJ=JL(J, IL(J)). Under the circumstances, the corresponding non-zero element of the lower triangular matrix La has a value equal to the two-dimensional array AA(IJ, 1) and has a column number which is represented by MOD(IJ, N)=I where MOD represents a function for calculating a residue.

When the column number J is equal to zero, the corresponding non-zero element is absent in the I-th row and the J-th column of the upper triangular matrix Ua. If the column number J is equal to zero, the step 43 returns back to the step 42 through the inner loop labelled JJ=2, ..., L or the outer loop I=1, ..., N.

In order to carry out the above-mentioned processing as regards all of the non-zero elements in the I-th row, the second variable JJ is varied from two to the second predetermined natural number L as indicated by the inner loop. In order to carry out the above-mentioned processing as regards all rows, the first variable I is varied from one to the first predetermined natural number N as indicated by the outer loop in the steps 42 through 45.

In the manner described above, the pointer array constructing section 11 constructs, as the pointer array, the N by L two-dimensional array JL which points to the lower triangular matrix La. The pointer array constructing section 11 produces the pointer array JL.

Figure 5:
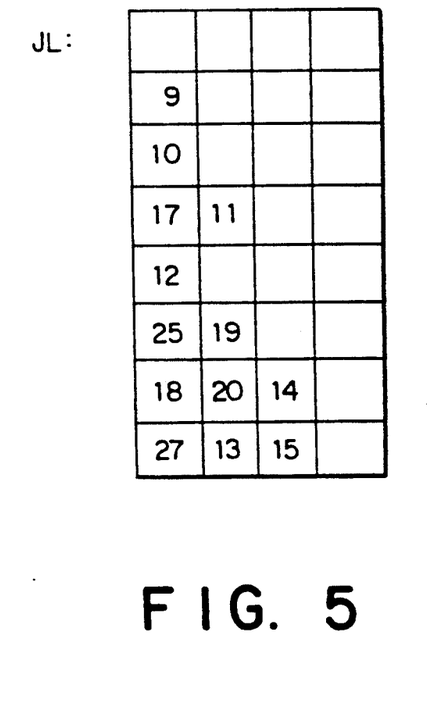
FIG. 5 shows an example of a pointer array which is produced by the pointer array constructing section illustrated in FIG. 4.

FIG. 5 exemplifies the pointer array JL produced by the pointer array constructing section 11.

Figure 6:
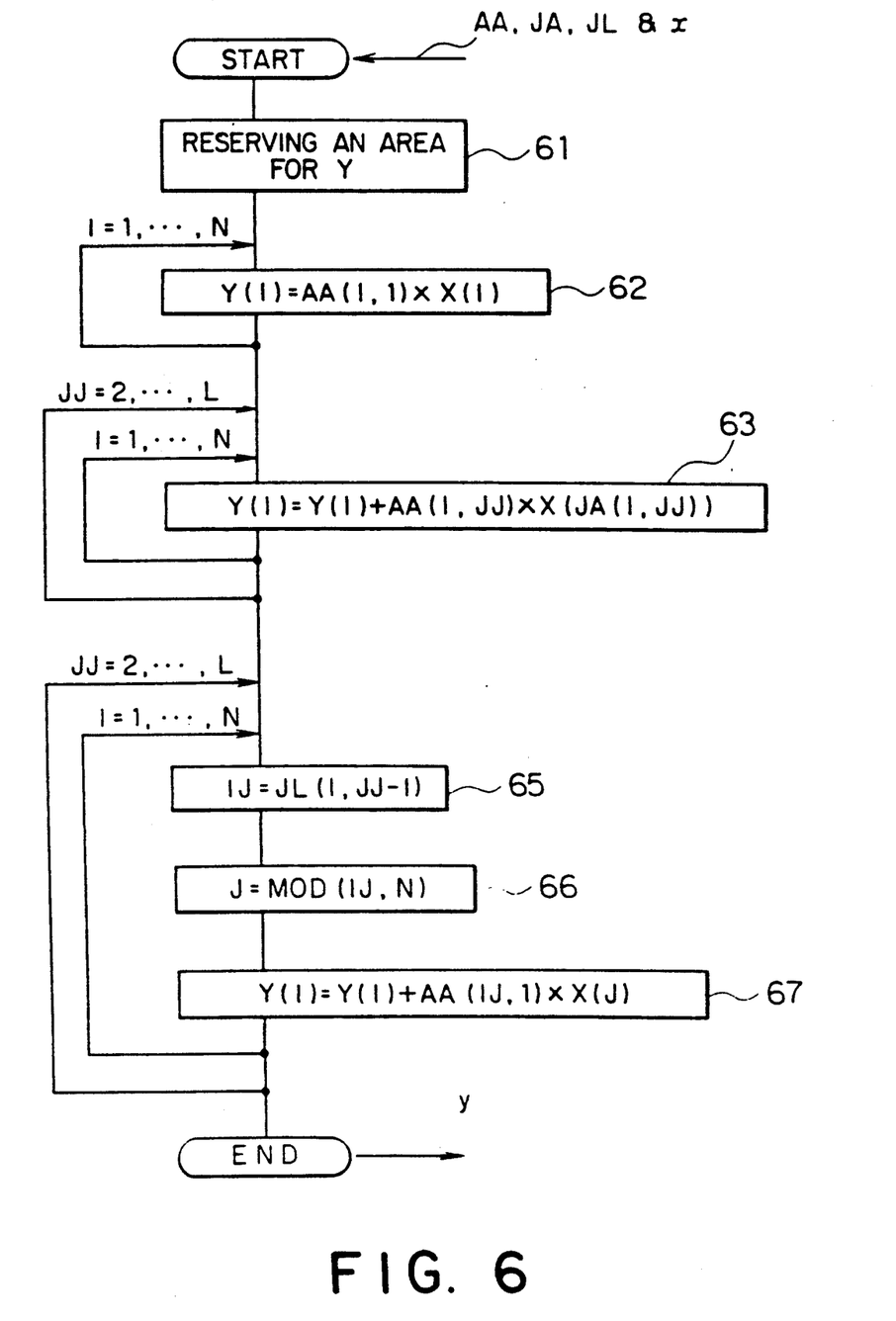
FIG. 6 shows a flow chart for use in describing operation of a first product calculation section for use in the device illustrated in FIG. 2.

Referring to FIG. 6 in addition to FIG. 2, the description will proceed to operation of the first product calculating section 16. It will be assumed as follows. The first vector x is represented by a one-dimensional real-number array X having N rows. The first product vector y is represented by a one-dimensional real-number array Y having N rows.

At a step 61, a memory area is reserved for use in storage of the one-dimensional type array Y therein. The step 61 is followed by a step 62 for calculating a product of the diagonal matrix Da and the first vector x. That is:

$$Y(I) = AA(I, 1) \times X(I), \quad (10)$$

where X(I) and Y(I) represent the I-th row elements of the arrays X and Y.

The step 62 proceeds to a step 63 for calculating a product of the upper triangular matrix Ua and the first vector x and adding the product to the one-dimensional array Y. That is:

$$Y(I) = Y(I) + AA(I, JJ) \times X(JA(I, JJ)), \quad (11)$$

where AA(I, JJ) represents the non-zero element of the I-th row and the JA(I, JJ)-th column in the upper triangular matrix Ua and JA(I, JJ) represents the corresponding column number. In order to carry out the above-mentioned calculation as regards all of the non-zero elements in the I-th row of the upper triangular matrix Ua, the first variable I is varied from one to the first predetermined natural number N as indicated by an inner loop labelled I=1, ..., N. In order to carry out the above mentioned calculation as regards all of the non-zero elements in all columns of the upper triangular matrix Ua, the second variable JJ is varied from two to the second predetermined natural number L as indicated by an outer loop labelled JJ=2, ..., L.

Subsequently, the first product calculating section 16 calculates a product of the lower triangular matrix La and the first vector x and adds the product to the one-dimensional array Y at steps 65 through 67. More particularly, the non-zero element of the J-th row and the I-th column in the lower triangular matrix La is referred by the third variable IJ which is represented by the pointer array JL(I, JJ−1) at the step 65. The non-zero element has the value represented by AA(IJ, 1) and has the column number J given by $$J = MOD(IJ, N), \quad (12)$$

as indicated by the step 66. The step 67 carries out the calculation and the addition as follows:

$$Y(I) = Y(I) + AA(IJ, 1) \times X(J). \quad (13)$$

The afore-mentioned processing of the steps 65 through 67 is carried out as regards all of the non-zero elements in the I-th row of the lower triangular matrix La by varying the first variable I from one to the first predetermined natural number N as indicated by an inner loop labelled I=1, ..., N. In order to carry out the above-mentioned processing as regards all of the non-zero elements in all columns of the lower triangular matrix La, the second variable JJ is varied from two to the second predetermined natural number L as indicated by an outer loop labelled JJ=2, ..., L.

Referring to FIG. 2, the description will proceed to operation of the matrix decomposing section 12. Various decomposing methods are already known in the art. In the example being illustrated, the matrix decomposing section 12 decomposes the diagonal matrix Da and the upper triangular matrix La into the approximate matrix M in accordance with the Cholesky decomposition. In the Cholesky decomposition, the approximate matrix M of the N by N symmetric coefficient matrix A with coefficient elements $a_{ij}$ (i, j=1, ..., N) is defined by:

$$M = Um^T Dm Um, \quad (14)$$

where Dm represents a diagonal matrix and Um, an upper triangular matrix and where $Um^T$ represents a transpose matrix of the upper triangular matrix Um. The diagonal matrix Dm and the upper triangular matrix Um are given by:

$$Dm = \begin{bmatrix} 1/d_1 & & & & \\ & 1/d_2 & & 0 & \\ & & \cdot & & \\ & & & \cdot & \\ & 0 & & \cdot & \\ & & & & 1/d_N \end{bmatrix}, \quad (15)$$

and $$Um = \begin{bmatrix} d_1 & a_{12} & \cdot & \cdot & \cdot & a_{1N} \\ & d_2 & a_{23} & \cdot & \cdot & a_{2N} \\ & & \cdot & & & \cdot \\ & & & \cdot & & \cdot \\ & 0 & & & \cdot & \cdot \\ & & & & & d_N \end{bmatrix}, \quad (16)$$

where elements $d_1, d_2, \ldots$, and $d_N$ are given by:

$$d_1 = a_{11}, \quad (17)$$

and $$d_n = a_{nn} - (a_{1n})^2/d_1 - (a_{2n})^2/d_2 - \ldots - (a_{(n-1)n})^2/d_{n-1}, \quad (18)$$

where n is variable from two to N, both inclusive.

Referring to FIG. 2, the description will proceed to operation of the second product calculating section 17. As mentioned above, the second product vector y' is equal to the product of the inverse matrix $M^{-1}$ of the approximate matrix M and the second vector x'. That is:

$$y' = M^{-1}x'. \quad (19)$$

The second product vector y' has first through N-th product elements $y'_1, \ldots, Y'_N$. Therefore, the second product vector y' is calculated by solving a linear equation which is given by:

$$My' = x'. \quad (20)$$

In order to solve the linear equation (20), first and second partial linear equations must be solved. The first partial linear equation will presently be described. The second partial linear equation will later be described. The first partial linear equation is as follows:

$$Um^T z' = x', \quad (21)$$

where z' represents an unknown vector with first through N-th unknown elements $z'_1, \ldots, z'_N$. Inasmuch as the transpose matrix $Um^T$ of the upper triangular matrix Um is a lower triangular matrix, the unknown vector z' is successively calculated in an ascending order from the first unknown element $z'_1$ to the N-th unknown element $z'_N$ as follows:

$$z'_1 = x'_1/d_1, \quad (21)$$

and $$z'_n = (x'_n - a_{1n}z'_1 - a_{2n}z'_2 - \ldots - a_{(n-1)n}z'_{n-1})/d_n. \quad (22)$$

The second partial linear equation is as follows:

$$(DmUm)y' = z', \quad (23)$$

where (DmUm) represent a product matrix which is equal to a product of the upper triangular matrix Um by the diagonal matrix Dm. Inasmuch as the product matrix (DmUm) is an upper triangular matrix, the second product vector y' is successively calculated in a descending order from the N-th product element $y'_N$ to the first product element $y'_1$ as follows:

$$y'_N = z'_N, \quad (24)$$

and $$y'_i = z'_i - (a_{ii+1}y'_{i+1} + \ldots + a_{iN}y'_N)/d_i, \quad (25)$$

where i is variable from (N−1) down to one, both inclusive.

The second product vector y' may be calculated by using a hyperplane method which is well known in the art.

Referring to FIG. 2, the description will proceed to operation of the iterative calculating section 18. Various iterative calculating methods are already known in the art. In the example being illustrated, the iterative calculating section 18 carries out the iterative calculation in accordance with a Preconditioned Conjugate Gradient (PCG) method which is well known in the art. It will be assumed that a k-th iterative time instant k is prior to a (k+1)-th iterative time instant (k+1) by an iterative period of the PCG method. Initial values x(0) and x'(0) of the first and the second vectors x and x' at an initial or a zero-th iterative time instant 0 are given by:

$$x'(0) = b - Au(0),$$

and $$x(0) = M^{-1}x'(0),$$

where u(0) represents an initial value of the solution vector u at the zero-th iterative time instant 0. An initial value of a variable $\sigma$ is given by:

$$\sigma = (x'(0), x(0)),$$

where the notation "( , )" represents an inner product of two vectors enclosed with a pair of parentheses. According to the PCG method, the solution vector u(k+1) at the (k+1)-th iterative time instant (k+1) is solved by using the solution vector u(k) at the k-th iterative time instant k as follows:

While $\| x'(k) \| > \text{eps} \ x \| b \|$, where $\| \cdot \|$ denotes the $L_2$ norm of a vector enclosed with a pair of two vertical lines and eps represents input data, repeatedly do:

$$\alpha = \sigma/(x(k), x'(k)),$$

$$u(k+1) = u(k) + \alpha x(k),$$

$$x'(k+1) = x'(k) - \alpha y(k),$$

$$\sigma_1 = (x'(k+1), y(k+1)),$$

$$\beta = \sigma_1/\sigma,$$

$$\sigma = \sigma_1,$$

$$x(k+1) = y'(k+1) + \beta x(k),$$

$$k = k+1,$$

as long as Inequality (26) holds, namely, until the second vector x' becomes to have the desired small norm described before.

It is noted that the first product vector y(k) at the k-th iterative time instant k and the second product vector y' (k+1) at the (k+1)-th iterative time instant (k+1) are iteratively calculated by the first and the second product calculating sections 16 and 17, respectively, as follows:

$$y(k) = Ax(k),$$

and $$y'(k+1) = M^{-1}x'(k+1).$$

While this invention has thus far been described in conjunction with a single preferred embodimen thereof, it will readily be possible for those skilled in the art to put this invention into practice in various other manners. For example, this invention is applicable also to a device which is supplied with, as input data, the above-mentioned right-hand side vector, the above-mentioned diagonal matrix and the above-mentioned lower triangular matrix instead of the above-mentioned upper triangular matrix. In this event, the pointer array constructing section constructs, in response to the lower triangular matrix, a pointer array which points to the upper triangular matrix. Supplied with the diagonal matrix and the lower triangular matrix, the matrix decomposing section decomposes the diagonal matrix and the lower triangular matrix into an approximate matrix which approximates the symmetric coefficient matrix. Supplied with the diagonal matrix, the lower triangular matrix, and a first vector and connected to the pointer array constructing section, the first product calculating section calculates a first product vector by using the diagonal matrix, the lower triangular matrix, the first vector, and the pointer array. Supplied with a second vector and connected to the matrix decomposing section, the second product calculating section calculates a second product vector by using the approximate matrix and the second vector. Supplied with the diagonal matrix, the lower triangular matrix, and the right-hand side vector and connected to the first and the second product calculating sections, the iterative calculating section carries out iterative calculation on the diagonal matrix, the lower triangular matrix, the right-hand side vector, said first and the second product vectors to iteratively provide the first and the second product calculating sections with the first and the second vectors.

What is claimed is:

1. A supercomputer for solving a symmetric linear system given by Au=b, where A represents a symmetric coefficient matrix, b represents a right-hand side vector, and u represents a solution vector, said symmetric coefficient matrix being equal to a three-term sum of a diagonal matrix plus an upper triangular matrix plus a lower triangular matrix which is equal to a transpose matrix of said upper triangular matrix, said supercomputer being supplied with said right-hand side vector, said diagonal matrix, and said upper triangular matrix, said supercomputer calculating said solution vector using said right-hand side vector, said diagonal matrix, and said upper triangular matrix, said supercomputer comprising:

a pointer array constructing section supplied with said upper triangular matrix to construct a pointer array which points to said lower triangular matrix to thereby speed up vector processing on said supercomputer;

a matrix decomposing section supplied with said diagonal matrix and said upper triangular matrix to decompose said diagonal matrix and said upper triangular matrix into an approximate matrix which approximates said symmetric coefficient matrix;

a first product calculating section, supplied with said diagonal matrix, said upper triangular matrix, and a first vector and connected to said pointer array constructing section, to calculate a first product vector using said diagonal matrix, said upper triangular matrix, said first vector, and said pointer array, said first product vector being equal to a product of said symmetric coefficient matrix and said first vector;

a second product calculating section, supplied with a second vector and connected to said matrix decomposing section, to calculate a second product vector using said approximate matrix and said second vector, said second product vector being equal to a product of an inverse matrix of said approximate matrix and said second vector; and an iterative calculating section, supplied with said diagonal matrix, said upper triangular matrix, said right-hand side vector and connected to said first and said second product calculating sections, to carry out iterative calculation using said supercomputer on said diagonal matrix, said upper triangular matrix, said right-hand side vector, said first and said second product vectors, said iterative calculating section iteratively providing said first and said second product calculating sections with said first and said second vectors to make said first and said second product calculating sections iteratively calculate said first and said second product vectors, respectively, said iterative calculating section producing said solution vector.

2. A supercomputer for solving a symmetric linear system given by Au=b, where A represents a symmetric coefficient matrix, b represents a right-hand side vector, and u represents a solution vector, said symmetric coefficient matrix being equal to a three-term sum of a diagonal matrix plus an upper triangular matrix plus a lower triangular matrix which is equal to a transpose matrix of said upper triangular matrix, said supercomputer being supplied with said right-hand side vector, said diagonal matrix, and said lower triangular matrix, said supercomputer calculating said solution vector using said right-hand side vector, said diagonal matrix, and said lower triangular matrix, said supercomputer comprising:

a pointer array constructing section supplied with said lower triangular matrix to construct a pointer array which points to said upper triangular matrix to thereby speed up vector processing on said supercomputer;

a matrix decomposing section, supplied with said diagonal matrix and said lower triangular matrix, to decompose said diagonal matrix and said lower triangular matrix into an approximate matrix which approximates said symmetric coefficient matrix;

a first product calculating section, supplied with said diagonal matrix, said lower triangular matrix, and a first vector and connected to said pointer array constructing section, to calculate a first product vector using said diagonal matrix, said lower triangular matrix, said first vector, and said pointer array, said first product vector being equal to a product of said symmetric coefficient matrix and said first vector;

a second product calculating section, supplied with a second vector and connected to said matrix decomposing section, to calculate a second product vector using said approximate matrix and said second vector, said second product vector being equal to a product of an inverse matrix of said approximate matrix and said second vector; and an iterative calculating section, supplied with said diagonal matrix, said lower triangular matrix, and said right-hand side vector and connected to said first and said second product calculating sections, to carry out iterative calculation on said diagonal matrix, said lower triangular matrix, said right-hand side vector, said first and said second product vectors, said iterative calculating section iteratively providing said first and said second product calculating sections with said first and said second vectors to make said first and said second product calculating sections iteratively calculate said first and said second product vectors, respectively, said iterative calculating section producing said solution vector.

3. A vector processor for solving a symmetric linear system given by Au=b, where A represents a symmetric coefficient matrix, b represents a right-hand side vector, and u represents a solution vector, said symmetric coefficient matrix being equal to a three-term sum of a diagonal matrix plus an upper triangular matrix plus a lower triangular matrix which is equal to a transpose matrix of said upper triangular matrix, said vector processor being supplied with said right-hand side vector, said diagonal matrix, and said upper triangular matrix, said vector processor calculating said solution vector using said right-hand side vector, said diagonal matrix, and said upper triangular matrix, said vector processor comprising:

a pointer array constructing section supplied with said upper triangular matrix to construct a pointer array which points to said lower triangular matrix to thereby speed up vector processing on said vector processor;

a matrix decomposing section supplied with said diagonal matrix and said upper triangular matrix to decompose said diagonal matrix and said upper triangular matrix into an approximate matrix which approximates said symmetric coefficient matrix;

a first product calculating section, supplied with said diagonal matrix, said upper triangular matrix, and a first vector and connected to said pointer array constructing section, to calculate a first product vector using said diagonal matrix, said upper triangular matrix, said first vector, and said pointer array, said first product vector being equal to a product of said symmetric coefficient matrix and said first vector;

a second product calculating section, supplied with a second vector and connected to said matrix decomposing section, to calculate a second product vector using said approximate matrix and said second vector, said second product vector being equal to a product of an inverse matrix of said approximate matrix and said second vector; and an iterative calculating section, supplied with said diagonal matrix, said upper triangular matrix, said right-hand side vector and connected to said first and said second product calculating sections, to carry out iterative calculation on said diagonal matrix, said upper triangular matrix, said right-hand side vector, said first and said second product vectors, said iterative calculating section iteratively providing said first and said second product calculating sections with said first and said second vectors to make said first and said second product calculating sections iteratively calculate said first and said second product vectors, respectively, said iterative calculating section producing said solution vector.

4. A vector processor for solving a symmetric linear system given by Au=b, where A represents a symmetric coefficient matrix, b represents a right-hand side vector, and u represents a solution vector, said symmetric coefficient matrix being equal to a three-term sum of a diagonal matrix plus an upper triangular matrix plus a lower triangular matrix which is equal to a transpose matrix of said upper triangular matrix, said vector processor being supplied with said right-hand side vector, said diagonal matrix, and said lower triangular matrix, said vector processor calculating said solution vector using said right-hand side vector, said diagonal matrix, and said lower triangular matrix, said vector processor comprising:

a pointer array constructing section supplied with said lower triangular matrix to construct a pointer array which points to said upper triangular matrix to thereby speed up vector processing on said vector processor;

a matrix decomposing section, supplied with said diagonal matrix and said lower triangular matrix, to decompose said diagonal matrix and said lower triangular matrix into an approximate matrix which approximates said symmetric coefficient matrix;

a first product calculating section, supplied with said diagonal matrix, said lower triangular matrix, and a first vector and connected to said pointer array constructing section, to calculate a first product vector using said diagonal matrix, said lower triangular matrix, said first vector, and said pointer array, said first product vector being equal to a product of said symmetric coefficient matrix and said first vector;

a second product calculating section, supplied with a second vector and connected to said matrix decomposing section, to calculate a second product vector using said approximate matrix and said second vector, said second product vector being equal to a product of an inverse matrix of said approximate matrix and said second vector; and an iterative calculating section, supplied with said diagonal matrix, said lower triangular matrix, and said right-hand side vector and connected to said first and said second product calculating sections, to carry out iterative calculation on said diagonal matrix, said lower triangular matrix, said right-hand side vector, said first and said second product vectors, said iterative calculating section iteratively providing said first and said second product calculating sections with said first and said second vectors to make said first and said second product calculating sections iteratively calculate said first and said second product vectors, respectively, said iterative calculating section producing said solution vector.

* * * * *